US012611958B2

(12) United States Patent
Eliseev

(10) Patent No.: US 12,611,958 B2
(45) Date of Patent: Apr. 28, 2026

(54) METHOD OF PARKING AND CHARGING THE VEHICLE

(71) Applicant: Leonid Leonidovich Eliseev, Krasnogorsk (RU)

(72) Inventor: Leonid Leonidovich Eliseev, Krasnogorsk (RU)

( * ) Notice: Subject to any disclaimer, the term of this patent is extended or adjusted under 35 U.S.C. 154(b) by 1032 days.

(21) Appl. No.: 17/765,641

(22) PCT Filed: Oct. 21, 2019

(86) PCT No.: PCT/RU2019/000753
§ 371 (c)(1),
(2) Date: Mar. 31, 2022

(87) PCT Pub. No.: WO2021/080447
PCT Pub. Date: Apr. 29, 2021

(65) Prior Publication Data
US 2022/0371468 A1     Nov. 24, 2022

(51) Int. Cl.
| | |
|---|---|
| *B60L 53/66* | (2019.01) |
| *G06Q 10/02* | (2012.01) |
| *G06Q 30/0645* | (2023.01) |
| *G07B 15/02* | (2011.01) |
| *G08G 1/0968* | (2006.01) |
| *G08G 1/14* | (2006.01) |

(52) U.S. Cl.
CPC ............ *B60L 53/665* (2019.02); *G06Q 10/02* (2013.01); *G06Q 30/0645* (2013.01); *G07B 15/02* (2013.01); *G08G 1/096816* (2013.01);

*G08G 1/144* (2013.01); *G08G 1/146* (2013.01); *B60L 2200/24* (2013.01); *B60L 2270/36* (2013.01)

(58) Field of Classification Search
CPC ...................................... B60L 53/665
USPC ......................................... 320/109
See application file for complete search history.

(56) References Cited

U.S. PATENT DOCUMENTS

| | | | | |
|---|---|---|---|---|
| 2016/0311334 A1* | 10/2016 | Moravick | ............... | B60L 58/12 |
| 2022/0305928 A1* | 9/2022 | Treadway | ............... | B60L 53/66 |

* cited by examiner

*Primary Examiner* — Eric D Lee
(74) *Attorney, Agent, or Firm* — Nadya Reingand

(57) ABSTRACT

The method of parking and charging the individual vehicle providing for reception by the control center of parking stations territorial network of information from the individual vehicle user about stop waypoints for vehicle parking and charging along his planned route, establishment of communication between the user and control unit of this parking station, mating the electric connector of the vehicle battery with the connector of the parking station parking/charging terminal, charging the battery and storage of the vehicle, testing the charged condition of the battery and operability of the electric vehicle, time control of vehicle connection/disconnection to/from parking terminal, provides mutual settlements between the user and parking operator, and also engages the lock to fix the vehicle at the parking terminal and disengages the lock to ensure use of the vehicle.

16 Claims, 5 Drawing Sheets

METHOD OF PARKING AND CHARGING THE VEHICLE

FIELD OF THE INVENTION

Figure 1:
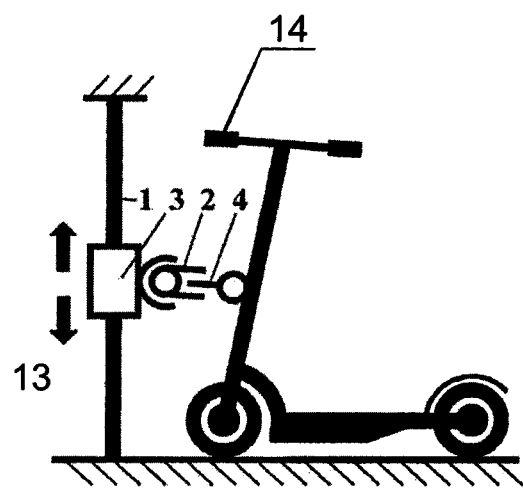

The invention is related to the field of transport, in particular, to the service of individual vehicles and means for en-route charging the batteries installed in the electric vehicles, in particular, electric scooters, electric bicycles, gyroscooters, unicycles, electric cars and other means of transport, both ground and designed for moving by water or air. The electric vehicles contain an accumulator (battery) that provides power supply for them and requires regular charging from an external electric power source, for which purpose suitable parking/charging stations are arranged in the places for parking and storage, which provide for charging the batteries of electric vehicles regardless of their make and model. The electric vehicles are fitted with a connector to connect the battery to the charging terminal of the parking station. During parking and storage process, it is possible to charge any electric vehicle with discharged battery in the parking station, equipped for that purpose.

PRIOR ART

A method and system facilitating the access to the electric vehicle charging network are known. In some versions, the system includes an interface, via which the electric vehicle may have access and/or log in one of multiple separate charging networks (US2015095218).

The methods of operation of the parking with charging terminal for electric vehicle batteries are known. These solutions ensure simplification and accessibility of electric vehicles batteries charging and enhanced functionality for load balancing of multiple charging stations for electric vehicles in the network of parking charging stations and efficient usage of the latter due to linking to the system integrated by computer communication means of the parking charging stations, as well as convenient use of the terminal; a facility for payment for services is provided (WO 2015/161862, GB2569014, JP2016015876, CN106494242, CN109383323).

The operation method is known for the electric vehicles (cars) charging station network server, which controls a number of charging stations, receives preferences, messages, notifications from subscriber and notifications to subscriber (e.g. electric vehicle driver) that specify one or more events of interest, for which the subscriber wishes to receive the notifications. A set of one or more contact points associated with the subscriber is also received. The server receives data related to the subscriber that indicate to the charging session established at one of the charging stations for the electric vehicle associated with the subscriber. The server detects an event of interest for the subscriber and sends a message with notification about this event to at least one contact point from the set associated with the subscriber (US2019152339).

The parking and charging method is known for the electric vehicles using the charging stations in the area, which comprises the following stages: a) Parking and assignment of electric vehicles to different equipment at the charging stations, b) Charging the electric vehicles according to information about available charge and providing the charging power by the supply equipment of the charging station, wherein matching the electric vehicle charging information, preferably load profiles, of electric cars and information about charging power, preferably provided charging power, of different charging stations is predicted based on information about the electric vehicle and charging station parameters. For the prediction, a charging fleet of electric vehicles for one of the charging stations is defined and electric vehicles of the charging fleet ($<\pi\iota<$) are temporarily grouped in different charging groups ($<\chi\iota<$, $N\sigma\iota<$, $N\pi\iota<$) for one charging station (CSk), wherein grouping in charging groups ($N\chi\iota<$, $N\sigma\iota<$, $N\pi\iota<$) is based on technical parameters, preferably at least on charging information of the electric vehicles in the charging fleet ($<\pi<$) and on information about charging power of one charging station (CSk), and at least one other charging station, preferably, an adjacent charging station. The charging fleet ($<\pi\iota<$) for the charging station (CSk) is determined according to preset distance ($\pi\iota<$) between the electric car and charging station (CSk), waiting time (tw) for the electric vehicle at the charging station (CSk) and/or preferences of the electric vehicle user. The information about charging power, preferably, information about the load, of adjacent preceding and following charging stations (CSk–1, CSk+1) in relation to one charging station is used for grouping. The exchange of information about electric car charging and/or information about charging power between the charging station (CSk) and electric car is realized via short-distance communication, preferably, at certain distance between the electric car and charging station (CSk). The exchange of information between the charging stations, preferably, information about charging station, preferably, information about load, fleet and/or charging power is realized via mobile communication, preferably, in 3G or 4G networks and/or via Internet (WO2013045449, prototype).

The known solutions have the following drawbacks: no protection from intervention of third parties, no capabilities to control, monitor, register and adjust in optimum way the parameters of specific individual vehicle matching with every parking station, in particular, characteristics of power consumption, receive information about parking station working parameters, enter data into the parking station control system that have effect on the parking station working parameters and on access to its use, monitor parking station parameters and operating modes and control them according to entered data that are verified and confirmed by the parking station control system, considering data received from the individual vehicle.

As a result, the existing and known means for recharging and charging the electric vehicles operate without considering optimization parameters and are targeted mainly to one-time discrete servicing of customers that are present in one location for a long time. This is usually clients of café, restaurants, fitness clubs, beauty parlours, etc., i.e. HoReCa sector (service/hotels/catering/distribution channel for the products that are consumed mainly at the point of sale), where clients should stay for prolonged periods.

SUMMARY OF THE INVENTION

The technical problem of the invention is creation of efficient method of parking, charging and storage of individual vehicle in order to ensure free choice of a route by user, with availability of reliable and prompt vehicle recharging (within certain area), using a universal equipment.

The technical result that ensures solution of above problem consists in creation of the method and system providing an interaction of the users with centralized territorial system of parking stations in the form of open dialog, where the control center receives data necessary for functioning of the parking stations territorial network and users receive all necessary information about parking stations network operating modes and available services (locations of parking stations, availability of vacant parking places, availability of rental vehicles, conditions of parking/charging services use, etc.). At the same time, use of this method will allow, during continuous stand-by duty, combining the long-term storage of the electric vehicles and continuous maintaining them in charged condition, check of charged devices operability and readiness for use. The proposed method enables a possibility to control, monitor, register and adjust in optimum way the parameters of specific individual vehicle matching with every parking station, in particular, characteristics of power consumption, and thus allows prompt access by request from fair user to the individual vehicle and respective information and thereby a possibility to rent any individual vehicle exactly when its use is necessary. The user is not bound by condition of mandatory return to the initial point where individual vehicle was taken, since he can return the received individual vehicle in several places within the area, in which stationary parking stations (terminals) of the network are located, or beyond of parking stations (by agreement with rental service operator and according to his conditions). The individual vehicles in the proposed system will be fully charged during the whole storage period (when possible), supervised, ready for giving out to users and have maximum possible protection from vandalism, accidental mechanical effects, weather effects and unauthorized access of third parties.

The concept of the invention is that method of parking and charging the individual vehicle provides for reception by the control center of parking stations territorial network of information from the individual vehicle user about stop points for vehicle parking and charging along his planned route (while fulfillment of this condition is not mandatory); selection of available parking station that is fitted with accessible parking/charging terminal with electric connector and lock; input of user data that allow for his identification and access to services of named parking station; establishment of communication between the user and control unit of this parking station; mechanical fixing and disabling of the individual vehicle on the allocated parking place by means of a lock and according to instructions from parking station operator; mating the electric connector of the electric vehicle battery with the connector of the parking station parking/charging terminal; charging the battery and storage of the electric vehicle; transfer of information about performed actions into the parking station control unit connected to mentioned above control center, where parking station control unit checks fulfillment of instructions from the parking station operator, mated state of the electric connector and lock, test of the battery charged condition and operability of the electric vehicle placed to the parking station, metering of power consumption parameters, calculation of charging cost, time control for the parking terminal reservation, time control for connected rental vehicle reservation, time control for vehicle connection/disconnection to/from parking terminal, as well as amount of rent for the parking terminal use at the parking station and transfer of mentioned data and information about occupancy of the parking station and operating modes of the parking terminals to the control center; provides mutual settlements between the user and parking operator; and also engages the lock to fix the vehicle in the parking terminal and disengages the lock to ensure user access to the individual vehicle that is ready for use. Some functions of the control unit may be performed by user's mobile electronic device and/or control center of parking stations territorial network using appropriate software.

Preferably, the user interacts with the parking station control unit and control center of parking stations territorial network using a programmable individual mobile electronic device and/or informational unit of the parking station.

Preferably, the electric vehicle is mechanically fixed and disabled by the lock and at the same time electric vehicle battery is mated with the parking station parking/charging terminal, using a universal parking/charging connector designed as structurally integrated lock and electric connector.

The electric vehicle battery is charged from territorial stationary electric grid or renewable energy sources.

The user enters information and data directly at the parking station or remotely, using a mobile device.

Preferably, the user is provided with recommended optimum route and respective calculation of trip duration as well as information about available and not reserved parking/charging terminals at the parking stations in expected intermediate stop points and trip finish point.

Preferably, the user enters data that allow him to get access to the parking station services, from the following group: information for user identification, information that confirms user's solvency or guaranteeing payment for parking services, mobile telephone number, e-mail address.

In particular cases of embodiment, the method provides for parking, charging and giving out of rental individual vehicles.

Preferably, the user is provided with information about specific individual vehicles at the nearest parking station, available for reservation and rent, conditions of rental vehicle use, and if there are no available vehicles at the nearest parking station—about their availability at other accessible parking stations.

Preferably, the user is provided for use of the rental vehicle with information about technical condition of the electric vehicles available for rent, particularly, battery charge level, cruising range in kilometers/miles, time until full charge.

In particular cases of embodiment, the method provides for parking, charging and storage of private individual vehicles.

Preferably, the user is provided with information about places for parking of the individual vehicles available at the nearest parking station, conditions of vehicle parking, and if there are no available places at the nearest parking station— about their availability at other accessible parking stations.

Preferably, when individual vehicle is used, the user is provided with information about technical condition of his electric vehicle, particularly, battery charge level, cruising range in kilometers/miles, time until full charge.

Preferably, the control center of the parking stations territorial network is linked with station control units via Internet.

Preferably, the control center of the parking stations territorial network generates information about current occupancy of all parking stations and transmits this information to the users using an application, and parking stations are equipped with facilities for cash and/or cashless payment for rent of the vehicle, parking services and consumed power from the following group: coin acceptor, bill note acceptor, card reader, etc., as well as receipt printer.

DRAWINGS SHORT DESCRIPTION

Figure 2:
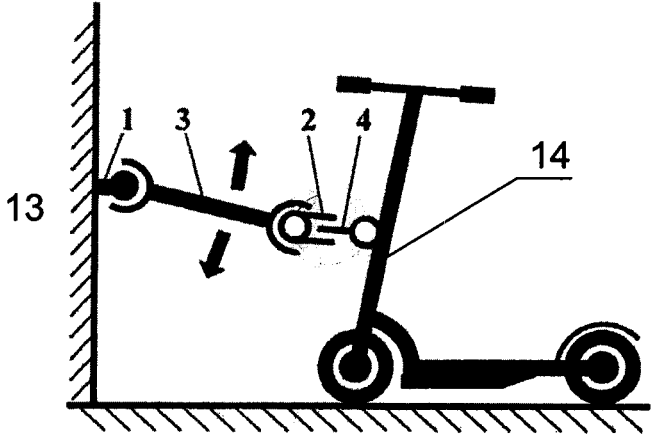
Figure 3:
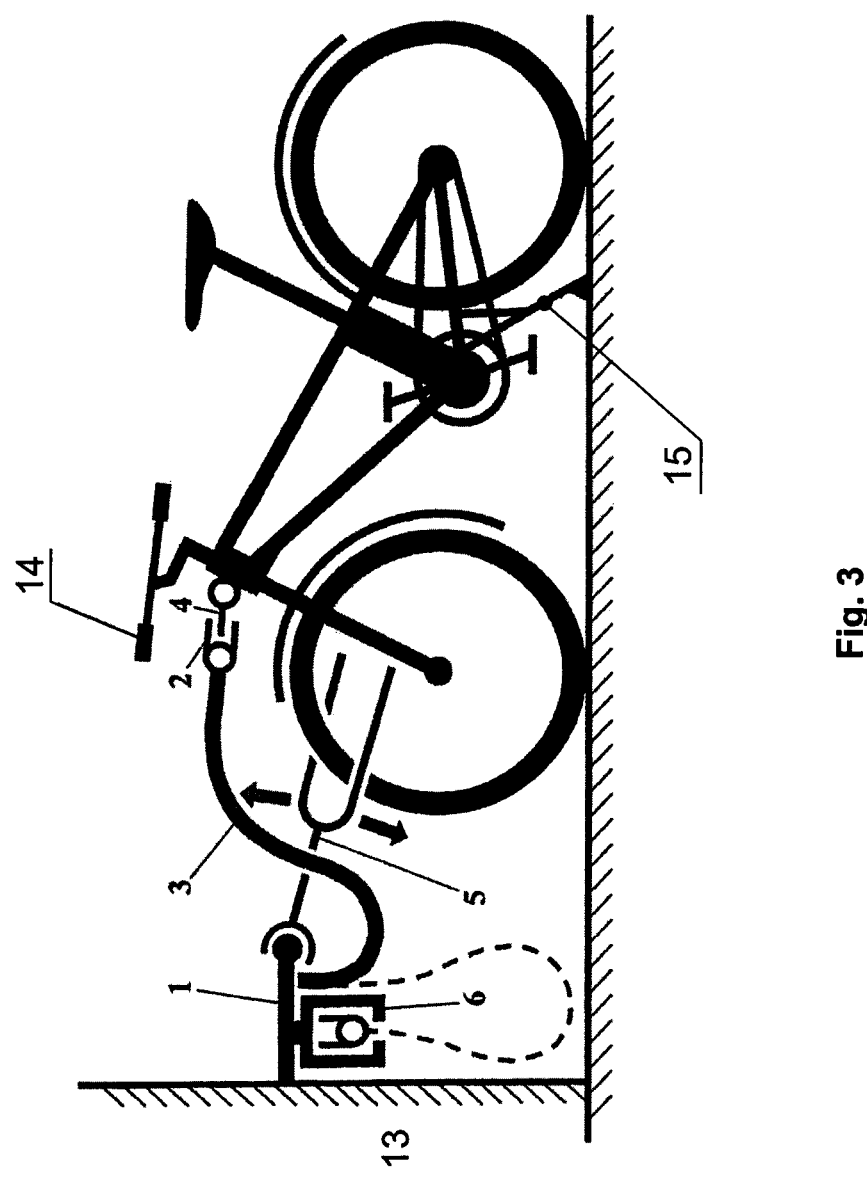
Figure 4:
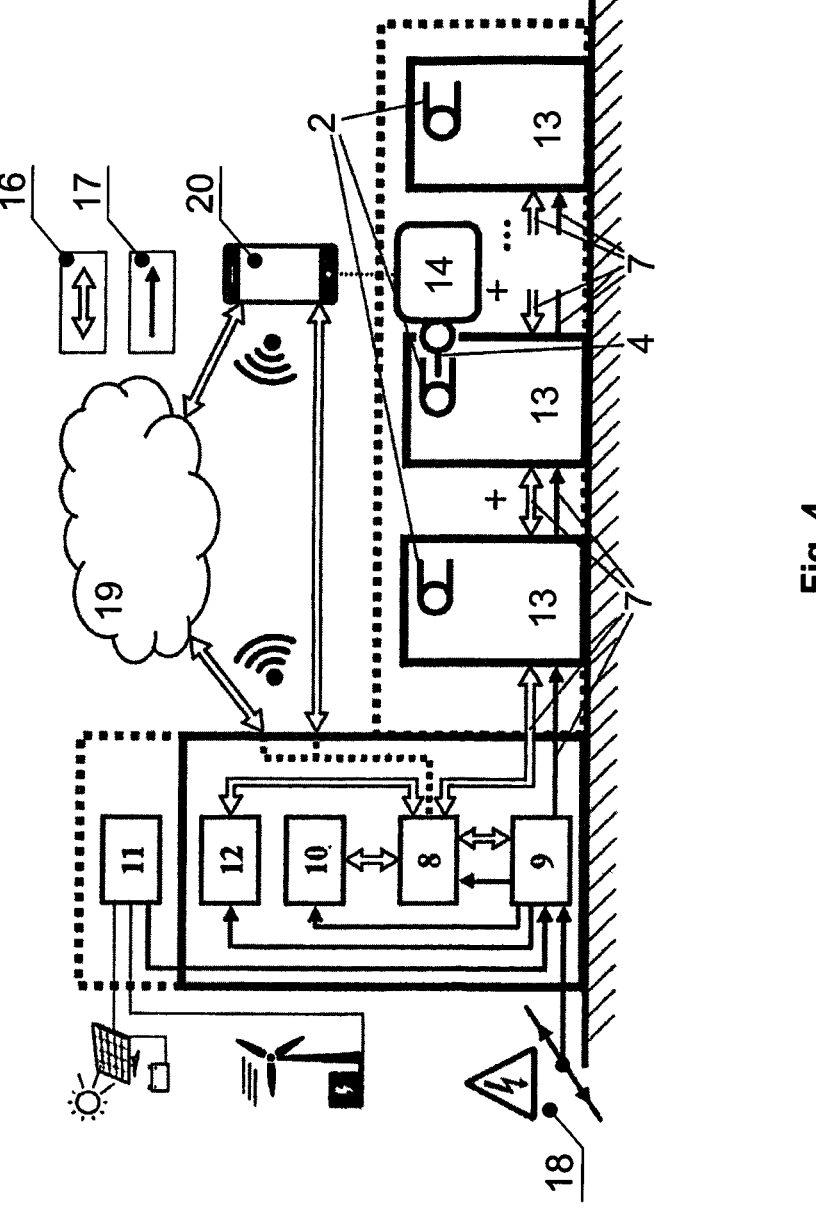
Figure 5:
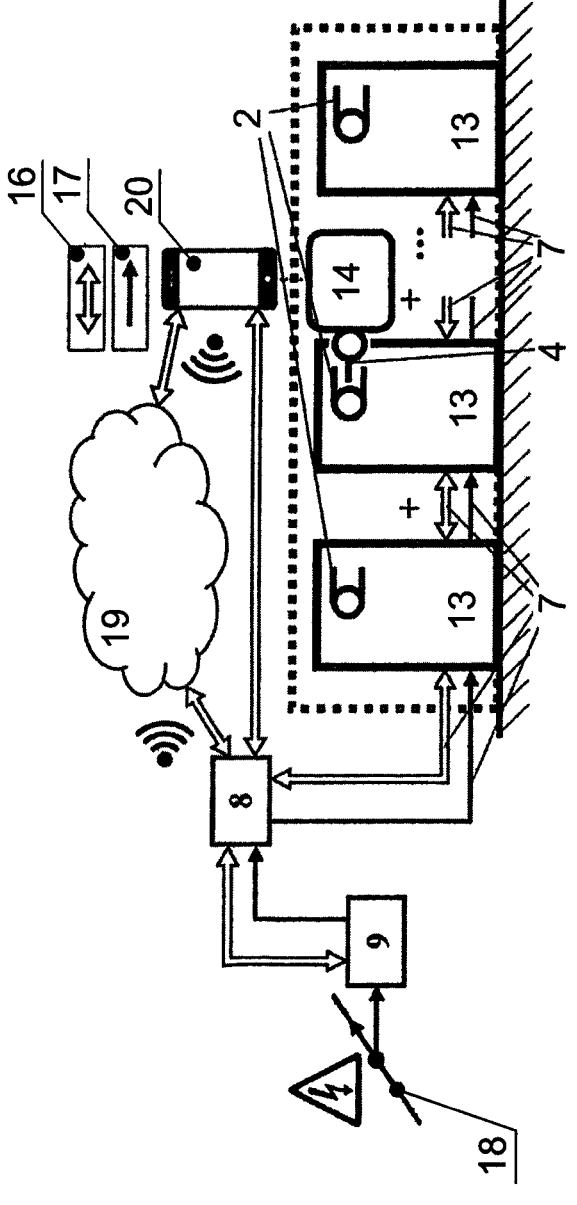
Figure 6:
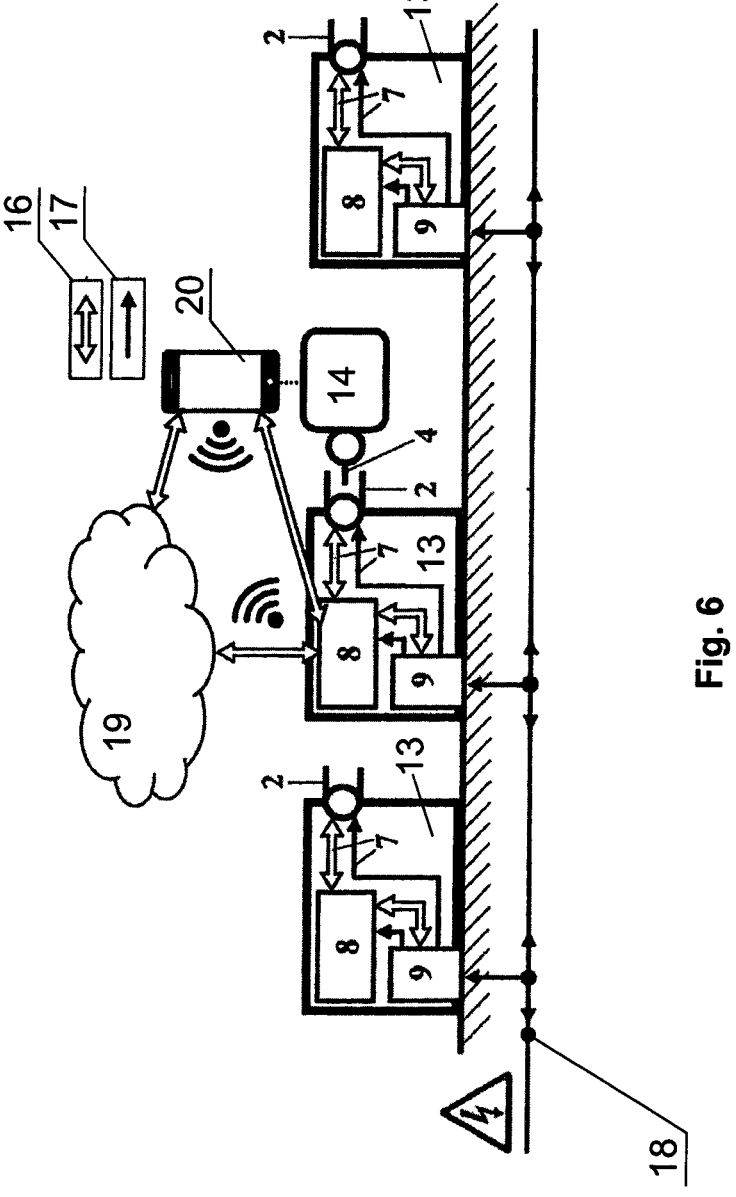

FIG. 1 presents schematic diagram of the system for electric scooter parking and charging from the terminal;

FIG. 2 presents schematic diagram of the system for electric scooter parking and charging using extended rigid rotating arm;

FIG. 3 presents schematic diagram of the system for electric bicycle parking and charging using extended flexible arm;

FIG. 4 presents an example parking (parking/charging) station in single case;

FIG. 5 presents an example parking (parking/charging) station integrated in the area infrastructure;

FIG. 6 presents an example parking (parking/charging) station of distributed type.

Designations in the drawings: 1—base, part of the parking/charging terminal (PCT), stationary fixed relative to road network or structural elements or premises; 2—locking device (lock), 3—arm, movable part of PCT that connects base 1 and lock 2; 4—counterpart of the individual vehicle connector that forms together with lock 2 a universal parking/charging connector, which is structurally mated lock and electric connector; 5—parking devices for bicycles, scooters and other vehicles provided in PCT; 6—special recess for storage of lock 2 in non-working state (stand-by mode); 7—electric cables, 8—control unit of parking/charging station (PCS); 9—power supply of parking/charging station; 10—informational unit; 11—alternative renewable energy sources; 12—security system; 13—parking/charging terminal (PCT); 14—individual vehicle (IV); 15—footboard; 16—data (information) transmission lines; 17—power lines; 18—territorial stationary power grid; 19—control center of the parking stations territorial network (remote informational system, IS); 20—user's electronic device (communicator, smartphone, watch, etc.).

DETAILED DESCRIPTION OF THE INVENTION

Preferred Embodiments

Base 1—part of the parking/charging terminal (hereinafter referred to as PCT or parking terminal or terminal) 13, stationary fixed relative to road network or structural elements or premises, relative to which the individual vehicle (IV) is fixed mechanically, not exceeding certain distance.

Locking device (lock) 2—part of construction of the parking/charging terminal (PCT) 13 connector, designed for mating with the counterpart 4 of the individual vehicle connector. The lock 2 is fitted with electric contacts and ensures: mechanical engagement and disengagement of counterpart 4 relative to the lock 2, supply of electric current for charging the IV battery, data exchange between IV 14 and parking/charging station (PCS) control unit 8.

Arm 3 joins base 1 and lock 2. Arm 3 ensures movement of lock 2 in vertical direction relative to base 1 and is connected with lock 2 in the way that allows lock 2 to rotate relative to three mutually perpendicular axes, thus enabling connection of any type of IV 14 (electric bicycle, electric scooter, gyroscooter, unicycle, etc.) to PCT. Arm 3 may have rigid construction (FIG. 1, FIG. 2), in which case PCT can hold IV in parking position without use of additional devices. Arm 3 may also have flexible construction (FIG. 3), in which case IV should be held in parking position with use of additional devices (footstep 15 on IV 14, parking assemblies 5 for bicycles, scooters and other IVs (as part of PCT), etc.), and lock 2 can be stored in non-working state (stand-by mode) in the special recess 6.

Counterpart 4—an assembly fixed to IV 14 and forming together with lock 2 a detachable joint in working state, i.e.

universal parking/charging connector, which is structurally mated lock 2 and counterpart 4 of the electric connector. Counterpart 4 has electric contacts connected with the battery and control unit of IV 14 and ensures mechanical fixing of IV 14 relative to PCT, as well as supply of electric current for charging the IV 14 battery and data exchange between IV 14 and PCT. The counterpart 4 may be additionally fitted with locking mechanism to ensure mechanical engagement and disengagement of IV 14 relative to lock 2 independently from the parking/charging station control unit 8, at user's option. The counterpart 4 may be installed to IV 14 using appropriate adapter bracket, as separate and independent component of IV 14 provided during its manufacture.

All components of PCT and counterpart 4 are made from sufficiently strong materials that ensure vandal-proof properties of entire construction. Lock 2 and counterpart 4 may also have covers to protect the connectors from dirt, moisture, dust and mechanical effects.

Electric cables 7 connect the electric connectors of the lock 2 with control unit 8 and power supply 9 of the parking/charging station.

The informational unit 10 ensures interaction between the user and PCS and have technical capabilities for output of visual and audio information reflecting parameters of PCS operation, and also for input of data to authorize IV enabling, disabling and IV battery charging. The informational unit 10 may have physical keypad, touch screen, scanner, photo/video camera, bank card reader, other means for interaction with electronic devices, bill note acceptor, coin acceptor, receipt printer.

The power supply 9 receives power from electric grid (accumulates and stores it, if required), converts into current with required parameters and supplies to functional devices (lock 2, charging contacts, informational unit 10, control unit 8, etc.). The power supply 9 can receive power also from alternative renewable energy sources 11 (solar, wind, water energy) using appropriate devices that can be components of PCS (solar batteries, wind generators, etc.).

The PCS may also comprise security system 12 (video cameras, sensors, sound alarm, etc.).

The control unit 8 performs interaction with the user, generates and transmits commands to the actuators (lock 2, power supply 9, informational unit 10, security system 12) based on data received from IV 14, user, IS 19, power supply 9, security system 12.

PCS size and performance are scalable by addition of required number of PCT 13 and modifying (if necessary) parameters of respective PCS components.

PCS components can be combined in single case (parking meter) (FIG. 4). PCS components can also be distributed as separate assemblies and integrated in local infrastructure (power grids, communications, etc.) (FIG. 5). Moreover, PCS components can be combined with each PCT and be individual units for each PCT (FIG. 6). Functions of the control unit and informational unit may also be performed by user's portable electronic device (smartphone, watch, etc. —P) and/or IS, using appropriate software.

Lock 2 together with counterpart 4 form a universal parking/charging connector, i.e. device for protection of IV against unauthorized use and at the same time for charging the battery of this IV. It is a mechanism capable to engage and disengage mechanically the connector parts and fitted with electric contacts for transmission of electric current and data and protecting electric contacts and integrity of connector parts joining in engaged state from external mechanical effects.

Universality of PCT use is ensured by lock 2 mobility relative to base 1, as well as due to employment by various manufacturers of same standardized geometrical and other technical parameters for production of the lock 2, counterpart 4 and other components of PCT, IV and parking/charging station (similarly to USB connector in computer technology).

In this case, standardized interface for connecting IV and PCT can have international designation UPCC (Universal Parking and Charging Connector). Other variants are al so possible, for example: UPC (Universal Parking Connector) or PCC (Parking and Charging Connector), etc.

When UPCC specification will be developed, the following must be ensured and considered:

Unification of connectors and cables,

Standardization of power consumption parameters,

Issues of functional compatibility with existing infrastructure (road network, power grids, communications, data transmission, processing and storage means, etc.), including considerations of the infrastructure development prospects, Data exchange protocols, Software issues.

Parking/charging station (PCS) can be established on the basis of PCT. Some of possible PCS workflows and designs and description of its main components are presented below (FIG. 4, FIG. 5, FIG. 6).

The informational unit 10 ensures interaction between user and PCS and have technical capabilities for output of visual and audio information reflecting parameters of PCS operation, and also for input of data to authorize IV enabling, disabling and IV battery charging. The informational unit may have physical keypad, touch screen, scanner, photo/video camera, bank card reader, other means for interaction with electronic devices, bill note acceptor, coin acceptor, receipt printer.

The power supply 9 receives power from electric grid (accumulates and stores it, if required), converts it into electric current with required parameters and supplies to functional devices (lock 2, charging contacts, control unit 8, etc.). The power supply 9 can receive power also from alternative renewable energy sources 11 (solar, wind, water energy) using appropriate devices that can be components of PCS (solar batteries, wind generators, etc.).

The PCS may also comprise security system 12 (video cameras, sensors, sound alarm, etc.).

The control unit 8 performs interaction with the user, IV control unit, IS, generates and transmits commands to the actuators (lock, power supply, informational unit, security system) based on data received from IV, user, IS, power supply, security system. PCS size and performance are scalable by addition of required number of PCT and modifying (if necessary) parameters of respective PCS components.

PCS components can be combined in single case (parking meter) (FIG. 4). PCS components can also be distributed as separate assemblies and integrated in local infrastructure (power grids, communications, etc.) (FIG. 5). Moreover, PCS components can be combined with each PCT and be individual units for each PCT (FIG. 6). The functions of the control unit 8 and informational unit 10 may also be performed by user's portable electronic device 20 (smartphone, watch, etc. —P) and/or IS 19, using appropriate software.

Introduction and development of PCS and PCT networks based on use of the universal parking/charging connector will allow a considerable expansion of the application field for various types of individual vehicles and make use of the individual transport means more convenient and easy.

The task related to use of the parking/charging terminal (PCT) in transport infrastructure consists in the following: using one mechanical device, to have capability to ensure protection of the individual vehicle (IV) against unauthorized use and, at the same time, charging the battery (if required) of any such IV fitted with suitable connector. The PCT will also allow data exchange between user, IV, parking/charging station control unit and remote informational system (IS) that processes data and participates in PCT control and operation process.

Preferably, the control center of the parking stations territorial network generates information about current occupancy of all parking stations and transmits it to the users via the application.

Preferably, the parking stations of the territorial network are located in areas of intensive passenger traffic and equipped with vending machines and dispensers for sale and selective giving out of associated goods.

Introduction and development of PCS and PCT networks based on use of the universal parking/charging connector (joint) 2, 4 will allow considerable expansion of application field for various types of individual vehicles and make use of the individual transport means more convenient and easy.

The method is implemented as follows:

1. Identification of Individual Vehicle

Any individual vehicle may be fitted with technical means (integrated circuits, chips, SIM cards, etc.) that collect and store data allowing identification of the individual vehicle (IV type, ownership to certain rental service operator (or user being physical person), identification No. (if any), specifications, tracking data (if possible technically), etc.) and indication of its technical condition (battery charge level, cruising range, degree of depreciation, residual life of structural components, etc.).

It is assumed that all rental individual vehicles will send information to the parking control system about rental service operator (including vehicle identification No., if any), vehicle specifications, technical condition and tracking data (depending on the vehicle technical capabilities).

Private individual vehicles may send data to the parking control system containing information about vehicle owner (service customer) and/or vehicle technical condition, at user's option (using settings of the vehicle and/or settings of application in user's mobile device).

Preferably, the universal parking/charging electric connector (joint), parking/charging terminal and parking (parking/charging) station based on such terminal are used for embodiment of claimed method.

The individual vehicle may send mentioned above data to the parking control system both remotely, via wireless communication (if possible technically), and via group of electric contacts for data transfer contained in the standardized universal parking/charging connector that is described above.

2. Identification of User

In order to get access to the services of this parking/charging system, the user enters data into the control system that allow his identification and confirmation of solvency and/or guarantee of payment for parking and charging services. These data are entered via the parking meter at the parking station or via application in user's mobile device.

When rental vehicle is used, individual vehicle identification may be used instead of user identification (in this case, mutual settlements, including for parking/charging services, will be made between rental service operator and user, and rental service operator, in turn, pays for rendered services to the parking system).

3. Identification of Parking/Charging Terminal Operating Modes

Each parking/charging terminal sends real-time data to the parking control system that contain information about location of this specific terminal (parking station address, terminal No., etc.) and its operating mode (waiting for user (available), in use (occupied), reservation of connected rental vehicle, availability of connected rental vehicle, reservation of parking place, electric energy consumed for charging the connected vehicle). When the vehicle is connected to the parking/charging terminal, the parking control system receives information about specific vehicle connected to this particular terminal (vehicle identification).

4. Centralized Data Processing and Centralized Control of Parking/Charging System All data from individual vehicles, users and parking/charging terminals come to common center for data processing and control of the parking/charging system (control center) via various technical means (cable, wireless communications, etc.).

In the control center, all received data are analyzed, checked, compared with reference parameters and a decision is taken, according to criteria of the parking control system and rental service operator, to render (or not render) the parking/charging services with certain parameters at specific parking/charging terminal to specific user.

According to this decision, the control center generates and sends to specific parking/charging terminal or PCS control unit the commands that activate respective actuators.

The control center also sends to the users (including rental service operators) via parking meter at the parking station, application in the mobile device or other ways, information about parameters of the parking system operation (locations of parking stations, availability of vacant parking places there, availability of rental vehicles and their technical characteristics, confirmation of reservation of vehicles and parking places, confirmation of user data and information related to the settlements, etc.).

Such control centers may be established in certain areas considering logistic and economical aspects and taking into account roads and infrastructure (existing and planned).

The transport infrastructure that uses such control centers is scalable according to area development tasks (change of control centers performance and capacity, multiplication of the control centers over adjacent areas when coverage of this parking system is expanded, association of the control centers into united system (e.g. for statistical analysis, optimization of data processing), etc.

Thus, at any moment, there is real-time interaction between the users and parking system in the form of open dialog (control centers receive data necessary for functioning of the parking system and users receive all necessary information about parking system operating modes and available services (locations of the parking/charging stations, availability of vacant parking places, availability of rental vehicles, conditions of parking/charging system services use, etc.)).

Procedure for Power Consumption Metering

Regardless of the fact, is the individual vehicle private or hired (rental), power consumption for charging its battery is metered according to common procedure:

When the vehicle is connected to the parking/charging terminal, the vehicle owner (user) is identified, contracting party for settlements (rental service operator or particular physical person) is defined and charging parameters are determined (automatic or manual).

Since the moment when the vehicle is connected to the parking/charging terminal and until the moment when it is disconnected from the terminal, the control center receives information about energy actually consumed for charging during this particular parking/charging session (charging start and end times (duration), voltage, current, their derivatives, etc.).

According to terms of contract between the parking system and the user, power consumption, along with other parking services, are rated in the control center and billed to the user (rental service operator or physical person).

Procedure for Rent Accounting

According to the principles of the vehicle, user and parking/charging terminal operating mode identification during use of the rental vehicle, the control center generates a data package for particular rent session that is bound to the specific vehicle and includes the following information:

Start time of rent session (if the rent starts at the parking station),

End time of rent session (if the rent ends at the parking station),

User data,

Duration of parkings at the intermediate stop points,

Period of vehicle reservation,

Period of parking places reservation at the intermediate stop points,

Actual power consumption for charging the vehicle battery,

Tracking/geolocation data (if possible technically).

This data package is sent to the rental service operator to generate a rent bill (including parking and charging services).

If the vehicle rent starts and/or ends off the parking station, the rental service operator himself registers place and start/end time of the vehicle rent session.

The rent bill (including parking and charging services) is generated by the rental service operator or parking system control center depending on mutual agreements between the parties, with exchange of necessary data between the parties.

According to terms of contract between the user and rental service operator, the rent bill (including parking and charging services) is drawn to the user as follows:

If the rent session ended off the parking station, the bill for the user is drawn by the rental service operator directly (same as settlements between them). Then mutual settlements between the rental service operator and parking system for rendered parking and charging services are made.

If the rent session ended at the parking station, with connection to the parking/charging terminal, then depending on mutual agreements between the rental service operator and parking system, the bill for the user may be drawn by the rental service operator directly or by the parking control system, with mutual settlements between the user and parking system made through the parking meter at the parking station or by another way. Then mutual settlements between the rental service operator and parking system for rendered services are made.

Algorithm of Requests for Vacant Parking Places, Available Vehicles, Recommendations to Visit Certain Parking Station, Etc.

1. When it is necessary to request information about availability of services offered by this parking/charging system (locations of parking/charging stations, vacant parking places, availability of the vehicles, their technical characteristics and conditions of use, etc.), the user should only enter the parking control system (even without input of personal data). The system can be entered via the parking meter at the parking/charging station or via application in user's mobile device or computer.

Since all data related to the parking/charging system operation are collected in the common informational center (control center of parking stations territorial network—control center) and are open (except personal data), the user can see after entering the parking control system all necessary information about available services of the parking system on the parking meter display or screen of his mobile device or computer (both in text form and in graphical form, on the map, including geolocation).

2. While selecting necessary service, the user enters corresponding request for this service in the parking control system using respective function of application in his mobile device or parking meter at the parking station (input of additional data when required, selection of offered options in the application, sending the request by corresponding interface button, etc.).

3. The control center compares the entered data with reference parameters, then:

3.1. If entered data are inconsistent relative to reference parameters, prompts the user to enter additional and/or correct data (showing respective message).

3.2. If entered data are consistent relative to reference parameters, confirms rendering of certain service (sending respective message to user and commands to respective actuators (electromechanical lock, charger, etc.)).

Thus, the method of individual vehicle, including electric motor-driven, parking and charging provides that, besides of individual vehicle placement for storage and taking it from storage that are authorized only by the user and parking control system (without possibility for third party to intervene), as well as registration and accounting of start and end times of vehicle storage, the vehicle battery can be charged and charging can be terminated only at user's option and by permission of the parking control system (without possibility for third party to intervene), including adjustment, monitoring, registration and accounting of power consumption parameters like: charging time (duration), voltage, current and their derivatives, and also this parking method allows the user to (including remotely, via mobile application): receive information about parking station operating parameters, enter data in the parking control system that have effect on the parking operating parameters and access to its use, monitor parking parameters and operating modes and control them according to entered data that are verified and confirmed by the parking control system, considering data received from the individual vehicle.

The method of parking, storage and charging the individual vehicle is realized by means of special software, using special mechanical, electromechanical and electronic devices, adapted for work with any type of individual vehicles (electric bicycle, electric scooter, gyroscooter, unicycle and other means of transport, both ground and designed for moving by water or air).

This parking method can be used both for rental individual vehicle and user's private vehicle, and works according to algorithms below:

In particular cases, when rental individual vehicle is used, the method is embodied as follows:

The user enters the parking control system (via parking meter at the parking station or remotely, via application in user's mobile device). The system shows available (not reserved) vehicles, their types (electric bicycle, electric scooter, gyroscooter, unicycle, etc.), technical condition (battery charge level, cruising range in kilometers/miles, time until full charge, etc.), conditions of vehicle use (according to requirements of certain rental service operator that owns this vehicle). When there are no available vehicles at this parking station, the system shows their availability at other nearest parking stations. Besides of that, the parking control system allows routing and calculation of trip duration using integrated navigation tools. The system also shows availability of vacant and not reserved parking places (terminals) at supposed waypoints of intermediate stops and trip finish point (in addition, time period, during which these parking places will expectedly remain vacant and conditions of their use may be shown).

The user selects rent parameters, like: rental service operator, vehicle type and technical condition—from available, manner of trip termination (at the parking station of beyond it)—when options are available, etc. The user also has a possibility to enter request for reservation of selected vehicle until trip start time (e.g. if the user needs certain time to reach the parking area), and when reservation is confirmed, the selected vehicle will wait for the user in disabled state at the parking station until trip start or reservation cancelling. Besides, the user has a possibility to enter request for reservation of parking places (terminals when they are available) in the waypoints of intermediate stops and trip (rent) finish point.

The user enters data that allow him to get access to the rental services, according to requirements of rental service operator (vehicle owner) and parking control system, for example:

data that allow identification of user, data confirming user solvency or guaranteeing payment for parking services (number of credit or other bank card, advance payment by money transfer to the special account for subsequent charge-off, etc.), mobile phone number, e-mail, etc.

At user's option, the entered data may be saved in the parking control system (user registration) to make data input easier during similar sessions of vehicle rent and parking in future. At user's option, mentioned above data may also be entered automatically (e.g. when parking control system is entered via application in user's mobile device).

4. Verification of the user data. The parking control system checks the entered data, compares with reference parameters, using its own criteria and rental service operator's criteria, and based on the results:

If entered data are inconsistent relative to reference parameters, the system informs the user and prompts to enter additional and/or correct data (back to par. 3).

If entered data are consistent relative to reference parameters:

When user is ready to start trip and confirms this (scanning of QR code, entering check code from SMS, selection of option in the application, etc.), the parking control system enables the selected vehicle, confirms reservation of parking places at the waypoints of intermediate stops and/or trip finish point if request for reservation was received (sends commands to respective actuators). The user starts the trip.

If request for vehicle reservation was received from the user before trip starts, the parking control system confirms vehicle reservation. The system also confirms reservation of parking places at the waypoints of intermediate stops and/or trip finish point, if request for reservation was received. When user arrives in a place where the vehicle is located and confirms that he is ready to start the trip, the parking control system enables the selected vehicle. The user starts the trip.

5. Trip 5.1. At any moment during use of this parking method, from entering the control system and to trip finish, the user can modify parameters of the parking operation related to reservation of parking places at the waypoints of intermediate stops and trip finish point (cancel requests for reservation, cancel confirmed reservations, send new requests for reservation, including at other points of intermediate stops and other trip finish point, depending on changes in the route). For this purpose, the user enters appropriate data in the parking control system (via parking meter at the parking station or application in user's mobile device).

If the individual vehicle is used via application and rental system of some certain operator and the trip started off the parking station, the user also has possibility to use services of this parking method according to instructions from the rental service operator for that case and instructions from the parking control system. The user enters appropriate data via parking meter at the parking station or application in user's mobile device (application of the parking control system or application of the rental service operator if it is adapted for work with this parking method).

Use of the parking places at the waypoints of intermediate stops.

When parking place reservation is confirmed, the user confirms after arrival in the waypoint of intermediate stop that he is ready to connect the vehicle to the parking terminal (scanning of QR code, entering check code from SMS, selection of option in application, etc.), the parking control system enables the parking terminal, the user connects the vehicle to the parking terminal and confirms the connection, the terminal fixes (disables) the vehicle. In order to resume the trip, the user confirms this intention, the parking control system enables the vehicle, the user resumes the trip, the parking terminal remains available for other users.

When reservation is not confirmed, the user checks after arrival in the waypoint of intermediate stop the available parking places via parking meter at the parking station or application in user's mobile device. When there are no available parking terminals at this parking station, the control system shows their availability at other nearest stations and proposes to use them. When there is available parking place, the user enters request for connection to the terminal, control system checks entered user data. If entered data are inconsistent relative to reference parameters, the system informs the user and prompts to enter additional and/or correct data. If entered data are consistent relative to reference parameters, the control system enables the parking terminal, the user connects the vehicle to the parking terminal and confirms the connection, the terminal fixes (disables) the vehicle. The trip is continued as described in par. 5.3.1.

6. Trip Finish.

The user terminates the trip (rent) either off the parking station (according to instructions from rental service operator) or at the parking station using this parking method:

When parking place reservation is confirmed, the user connects the vehicle after arrival in the trip finish point to the parking terminal, same as in par. 5.3.1.

When reservation is not confirmed, the vehicle is connected to the parking terminal in the same way as described in par. 5.3.2.

7. Parking Operating Parameters

If possible from technical point of view, some steps of the algorithm above can be performed automatically, for example: data input to the parking control system, confirmation of user arrival in the vehicle location, confirmation of user readiness to connect the vehicle to the parking terminal, confirmation of vehicle connection to the parking terminal, etc.

When the vehicle is connected to the parking terminal, parameters and modes of the vehicle battery charging will be set considering data received by the parking control system from the vehicle, according to requirements from the rental service operator and technical capabilities of the parking station, automatically or with user's participation (if such option is available).

Throughout the whole process of use of this individual vehicle parking and storage method, the parking control system registers and accounts parameters of the parking operation and power consumption during the vehicle battery charging, like: time of vehicle placement for storage, time of taking it from storage, time (duration) of vehicle reservation, time (duration) of parking terminal reservation, time (duration) of charging, voltage, current and their derivatives, etc.

8. Mutual Settlements

When the trip (rent) termination off the parking station or at the parking station, after connecting the vehicle to the terminal, is confirmed by the user, the parking control system registers actually consumed power for the vehicle battery charging, time of vehicle reservation, time of parking terminals reservation, time of vehicle storage in this rent session, calculates cost of parking services according to the rates and draws the bills for the user and rental service operator.

The mutual settlements according to the bills between the user and the parking, the rental service operator and the parking, the user and the rental service operator are performed according to agreements between the parties (money charge-off from bank card, charge-off from special account, payment by cash in the parking meter, credit payment, etc.). If possible from technical point of view, mutual settlements between the parties above can be performed automatically.

When the settlements are completed, the user receives payment receipt (sales check) or bill for repayment, in the parking meter at the parking station in paper form or via available communication means in electronic form. Hereby the rent session is completed.

In particular cases, when user's private individual vehicle is used, the method is embodied as follows:

The user enters the parking control system (via parking meter at the parking station or remotely, via application in user's mobile device). The system shows availability of vacant (not reserved) parking places (terminals) along the planned route (in addition, time period, during which these parking places will expectedly remain vacant and conditions of their use may be shown).

Selection of parking modes and battery charging parameters. The user has a possibility to enter request for reservation of parking places (terminals when they are available) at the stop waypoints of the planned route. When the user is at the parking station and wishes to use parking services, he can enter request for connection to available parking terminal. Depending on technical capabilities of the parking station, the user can also select modes and parameters of battery charging for his vehicle, for example: automatic optimum charging, depending on battery technical condition, quick charging, without charging, etc. When there are no available parking places at this parking station, the system shows their availability at other nearest parking stations and proposes to use them.

The user enters data that allow him to get access to parking services, according to requirements of the parking control system, like:

data that allow identification of the user, data confirming user solvency or guaranteeing payment for parking services (number of credit or other bank card, advance payment by money transfer to the special account for subsequent charge-off, etc.), mobile phone number, e-mail, etc.

At user's option, the entered data may be saved in the parking control system (user registration) to make data input easier during similar sessions of individual vehicle parking in future. At user's option, mentioned above data may also be entered automatically (e.g. when parking control system is entered via application in user's mobile device).

4. Verification of the User Data. The System Checks the Entered Data, Compares with Reference Parameters, Using its Own Criteria, and Based on the Results Proceeds as Follows:

If entered data are inconsistent relative to reference parameters, the system informs the user and prompts to enter additional and/or correct data (back to par. 3).

If entered data are consistent relative to reference parameters:

If the user is ready to connect the vehicle to the parking terminal and confirms this (scanning of QR code, entering check code from SMS, selection of option in application, etc.), the parking control system enables the parking terminal, the user connects the vehicle to the parking terminal and confirms the connection, the terminal fixes (disables) the vehicle. The vehicle storage period starts.

If request for parking places reservation is received from the user, the parking control system confirms parking terminals reservation at stop waypoints of the planned route (sends commands to respective actuators). When user arrives in the parking place and confirms that he is ready to connect the vehicle to the parking terminal, the vehicle is placed for storage, same as in par. 4.2.1.

5. Parking Operating Parameters

If possible from technical point of view and at user's option, some steps in the algorithm above can be performed automatically, for example: data input into the parking control system, confirmation of user readiness to connect the vehicle to the parking terminal, confirmation of vehicle connection to the terminal, etc.

At any moment during use of this parking method, from entering the control system and to trip finish, the user can modify parameters of the parking operation related to reservation of parking places at stop waypoints of the planned route (cancel requests for reservation, cancel confirmed reservations, send new requests for reservation, including at other stop waypoints, depending on changes in the route). For this purpose, the user enters appropriate data into the parking control system (via parking meter at the parking station or application in user's mobile device).

When the vehicle is connected to the parking terminal, parameters and modes of the vehicle battery charging will be set considering data received by the parking control system from the vehicle, according to user's wishes and technical capabilities of the parking station, automatically or using manual settings (if such options are available).

Throughout the whole process of use of this individual vehicle parking and storage method, the parking control system registers and accounts parameters of the parking operation and power consumption during the vehicle battery charging, like: time of vehicle placement for storage, time of storage end, time (duration) of parking terminal reservation, time (duration) of charging, voltage, current and their derivatives, etc.

The vehicle storage period completion and mutual settlements.

6.1. At each parking terminal, after end of the vehicle storage period confirmed by the user, the parking control system registers actually consumed power for the vehicle battery charging, time of this parking terminal reservation, time of vehicle storage at this terminal, calculates cost of parking services according to the rates and draws the bill for the user (on the parking meter display or in the message to user's mobile device).

The mutual settlements according to the bill are performed between the user and the parking according to agreements between the parties (money charge-off from bank card, charge-off from special account, payment by cash in the parking meter, credit payment, etc.). If possible from technical point of view, mutual settlements between the parties above can be performed automatically.

When the settlements are completed, the user receives payment receipt (sales check) or bill for repayment, in the parking meter at the parking station in paper form or via available communication means in electronic form; the parking control system enables the vehicle, the parking terminal becomes available for other users. Hereby the session of use of this method is completed.

Thus, embodiment of this method ensures interaction of users with centralized territorial system of parking stations in the form of open dialog, where the control center receives data necessary for functioning of parking stations territorial network and users receive all necessary information about parking stations network operating modes and available services (locations of the parking stations, availability of vacant parking places, availability of rental vehicles, conditions of use of the parking/charging stations system, etc.). At the same time, use of this method will allow, during continuous stand-by duty, to combine long-term storage of the electric vehicles and continuous maintaining them in charged condition, check of charged devices operability and readiness for use. The proposed method enables a possibility to control, monitor, register and adjust in optimum way the parameters of specific individual vehicle matching with every parking station, in particular, characteristics of power consumption, and thus allows prompt access, by request from fair user, to the individual vehicle and respective information and thereby a possibility for renting any individual vehicle exactly when its use is necessary. The user is not bound by condition of mandatory return to the initial point where individual vehicle was taken, since he can return the received individual vehicle in several places within the area, in which stationary parking stations (terminals) of the network are located, or beyond of the parking stations (by agreement with rental service operator and according to its conditions). The individual vehicles in proposed system will be during the whole storage period fully charged (when possible), supervised, ready for giving out to users and have maximum possible protection from vandalism, accidental mechanical effects, weather effects and unauthorized access of third parties.

INDUSTRIAL APPLICATION

The present invention can be embodied with multipurpose equipment extensively employed by the industry.

What is claimed is:

1. A method for parking and charging an electric vehicle, the method comprising:

selecting a parking station from available vacant parking stations each equipped with a parking/charging terminal, the parking/charging terminal comprising:

a base;

a lock configured to engage and disengage with and from a counterpart assembly of the electric vehicle, the counterpart assembly being electrically connected with a battery of the electric vehicle;

an electric connector structurally integrated into the lock; and an arm configured to join the base and the lock so as to cause the lock to move in a vertical direction relative to the base, the arm being connected with the lock so as to further cause the lock to rotate relative to three mutually perpendicular axes;

inputting user data allowing user identification and access to services of the parking station;

establishing communication between a user of the electric vehicle and a control unit of the parking station; and mechanically fixing and disabling the electric vehicle by means of the lock at an assigned parking place of the parking station according to instructions from a parking station operator;

wherein said mechanically fixing comprises moving the lock in the vertical direction and rotating the lock relative to the three mutually perpendicular axes so as to engage the lock with the counterpart assembly of the electric vehicle, thereby providing simultaneous charging and storage of the electric vehicle.

2. The method according to claim 1, further providing for reception by a control center of a parking stations territorial network an information from the user of the electric vehicle about stop waypoints on a planned route for parking and charging the electric vehicle.

3. The method according to any of claims 1, 2, further providing transfer of information about actions performed at the parking station to the control unit of the parking station linked with a control center of a parking stations territorial network, where the control unit of the parking station checks a fulfillment of the instructions from the parking station operator, a mated state of the counterpart assembly and the lock, tests a charged condition of the battery and checks an operability condition of the electric vehicle placed at the parking station, accounts power consumption parameters, calculates a charging cost, performs a time control for a reservation of the parking/charging terminal, a time control for a reservation of the electric vehicle, a time control for a connection and disconnection of the electric vehicle to and from the parking/charging terminal, as well as an amount of rent for use of a place at the parking station, as well as sends to the control center data about the charged condition of the battery, the operability condition of the electric vehicle, the power consumption parameters, the charging cost, the amount of rent for use of the place at the parking station and information about occupancy of the parking station and operating modes of the parking/charging terminal, ensures mutual settlements between the user and the parking station operator, as well as engages the lock to fix the electric vehicle at the parking terminal and disengages the lock to provide access to the electric vehicle when the electric vehicle is ready for use.

4. The method according to any of claims 1, 2, wherein the user interacts with the control unit of the parking station and a control center of a parking stations territorial network by connecting a programmable individual mobile electronic device.

5. The method according to claim 1, wherein the battery of the electric vehicle is charged from a territorial stationary electric grid or renewable energy sources.

6. The method according to any of claims 1, 2, 5, wherein the user enters information and data directly at the parking station or remotely, using a mobile device.

7. The method according to claim 1, wherein the user is provided with a recommended optimal route and a respective calculation of trip duration as well as information about available and not reserved parking/charging terminals at the available vacant parking stations at expected intermediate stop waypoints and a trip finish point.

8. The method according to claim 7, wherein the user enters data that allow the user to get access to the services of the parking station, the data comprising at least one of: an information for a user identification, an information that confirms a user's solvency or a guaranteeing payment for the services of the parking station, a mobile telephone number, an e-mail address.

9. The method according to claim 1, further comprising providing for parking, charging and giving out of rental electric vehicles.

10. The method according to claim 9, wherein the user is provided with information about the rental electric vehicles available for reservation at a nearest parking station from the available vacant parking stations conditions for use of the rental electric vehicles, and when there are no rental electric vehicles available for reservation at the nearest parking station, the user is provided with an information about availability of the rental electric vehicles at least one other nearest parking station from the available vacant parking stations.

11. The method according to claim 10, wherein the user is provided with an information about a technical condition of the rental electric vehicles, the information about the technical condition of the rental electric vehicles comprising a battery charge level, a cruising range in kilometers/miles, a time until full charge.

12. The method according to claim 1, further comprising providing for parking, charging and storage of a private electric vehicle of the user.

13. The method according to claim 12, wherein the user is provided with an information about parking places for the private electric vehicle which are available at a nearest parking station from the available vacant parking stations, conditions for use of the parking places, and when there are no available parking places at the nearest parking station, the user is provided with an information about availability of parking places at at least one other nearest parking station from the available vacant parking stations.

14. The method according to claim 13, when the private electric vehicle is used, the user is provided with an information about a technical condition of the private electric vehicle, the information about the technical condition of the private electric vehicle comprising a battery charge level, a cruising range in kilometers/miles, a time until full charge.

15. The method according to claim 1, wherein the control unit of the parking station is linked with a control center of a parking stations territorial network via Internet.

16. The method according to claim 1, wherein a control center of a parking stations territorial network generates an information about current occupancy of each of the available vacant parking stations and transfers the information about the current occupancy of each of the available vacant parking stations to users using an application, and each of the available vacant parking stations is equipped with facilities for cash and/or cashless payment for use of rental electric vehicles, parking services and a consumed power, the facilities comprising at least one of a coin acceptor, a bill note acceptor, and a card reader, and further comprising a receipt printer.

\* \* \* \* \*